(No Model.)
R. F. HAGEMAN, D. NOGGLE & R. S. EADS.
CORN SHUCK COMPRESSOR.
No. 383,355. Patented May 22, 1888.
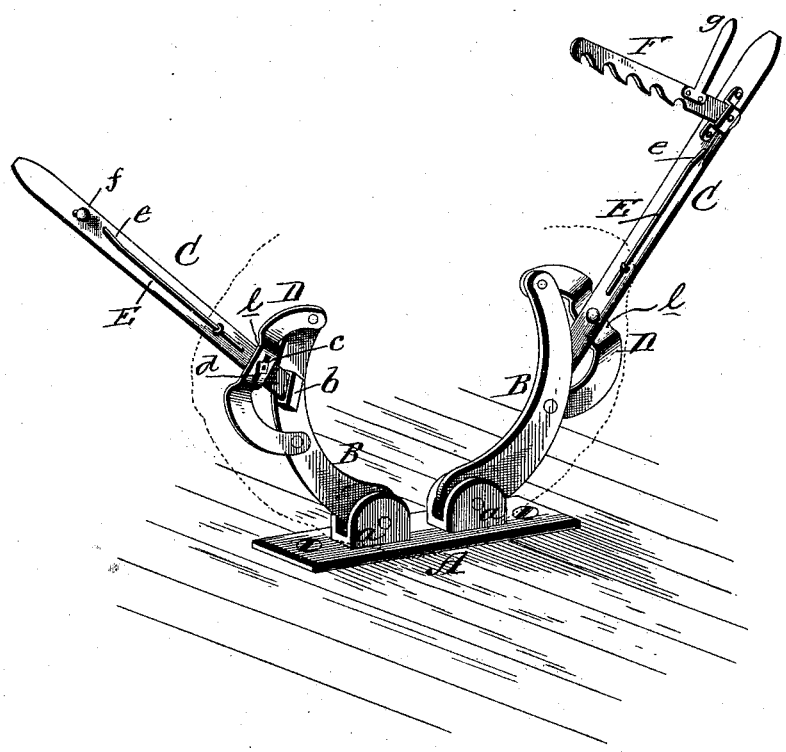
Witnesses.
G. S. Elliott,
Frank L. Smith.
Inventors.
Randolph F. Hageman,
David Noggle,
Rowland S. Eads.
per Chas. H. Fowler Attorney.
N. PETERS. Photo-Lithographer, Washington, D. C.

UNITED STATES PATENT OFFICE.

RANDOLPH F. HAGEMAN, DAVID NOGGLE, AND ROWLAND S. EADS, OF NEW MADISON, OHIO.

CORN-SHUCK COMPRESSOR.

SPECIFICATION forming part of Letters Patent No. 383,355, dated May 22, 1888.

Application filed December 13, 1887. Serial No. 257,785. (No model.)

*To all whom it may concern:*

Be it known that we, RANDOLPH F. HAGEMAN, DAVID NOGGLE, and ROWLAND S. EADS, citizens of the United States, residing at New Madison, in the county of Darke and State of Ohio, have invented certain new and useful Improvements in Corn-Shuck Compressors; and we do hereby declare that the following is a full, clear, and exact description of the same, reference being had to the annexed drawing, making a part of this specification, and to the letters and figures of reference marked thereon.

The present invention has relation to that class of devices especially adapted for compressing corn-shucks, hay, and other like fodder for animals while said fodder is being tied in bundles.

The invention consists in the novel construction of the several parts, whereby the compression of the fodder is rendered simple and effective and securely held in this compressed condition while being tied, which construction is substantially shown in the drawing, and hereinafter described and claimed.

In the accompanying drawing, which represents a perspective view of our invention, A designates a bracket of metal, provided with suitable means for securely fastening it to the floor or other support, said bracket having upwardly-extending flanges $a$, between which are pivoted the curved compressing-arms B. Between these arms are placed the corn-shucks or fodder to be compressed, and each arm is provided with a hand-lever, C, connected, respectively, to opposite sides thereof. The levers at their lower ends fit in socket-plates $b$ upon the sides of the arms, the latter of which have each a fulcrum-bar, D, curved and formed with lateral bends $l$ between their ends, as shown, so that the ends of the levers will be disposed between the bars and compressing-arms, thereby rendering their connections stronger and more durable to resist the strain upon them in the act of compressing the fodder and rendering their connections with the bars and arms less liable of working loose. The ends of the levers C loosely fit in the socket-plates $b$, and are connected to the bars D by means of screw bolts and nuts, as shown at $c$, said bolts passing through elongated slots $d$, whereby said levers can have a slight lateral play to prevent strain on the compressing arms and bars.

The levers C have each a spring-wire cord-holder, E, secured at one end to the levers, and the opposite or upper ends remain unattached and are bent outward from the levers, as shown at $e$, to enable the binding-cord to be conveniently passed between the wires and levers, the spring of the wires holding the cord in place while the fodder is being compressed. One of said levers has a suitable catch, $f$, with which engages a notched plate, F, provided with a handle, $g$, for engaging or disengaging said plate with the catch, the plate being suitably pivoted to the lever opposite to the lever having the catch.

In the operation the arms B are extended, as shown, and the cord (which is shown in dotted lines) engaged with the wire holders E, the cord being in such position that when the fodder is placed between the arms the cord will be under it. After a sufficient quantity of fodder is placed between the arms, said arms are brought together by means of the levers C, and when the fodder is sufficiently compressed the notched plate F is made to engage with the catch $f$, after which the cord can be brought around the fodder and tied in a bundle or sheaf.

The device may be used for bundling straw or any loose product that it is found desirable to compress before it is tied.

Having now fully described our invention, what we claim as new, and desire to secure by Letters Patent, is—

The combination, with a suitable bracket and the curved compressor-arms B, pivoted at one end thereto, of the fulcrum-bars D, secured one to each of the compressor-arms and curved, as shown, the levers C, connected to the arms B, and disposed between said arms and the fulcrum-bars in the laterally-curved portions $l$ of the bars, and connected to said bars by a loose connection, as the bolts $c$ and elongated slots $d$, and the cord-holders secured to the levers C, with one end free, substantially as and for the purpose specified.

In testimony that we claim the above we have hereunto subscribed our names in the presence of two witnesses.

RANDOLPH F. HAGEMAN.
DAVID NOGGLE.
ROWLAND S. EADS.

Witnesses:
R. O. MILLS,
GEORGE W. HYDE.